United States Patent
Rudolf

(10) Patent No.: US 12,303,075 B2
(45) Date of Patent: *May 20, 2025

(54) CUTTING BOARD AND WASHER SYSTEM AND METHOD

(71) Applicant: Peter C. Rudolf, Everett, WA (US)

(72) Inventor: Peter C. Rudolf, Everett, WA (US)

( * ) Notice: Subject to any disclaimer, the term of this patent is extended or adjusted under 35 U.S.C. 154(b) by 350 days.

This patent is subject to a terminal disclaimer.

(21) Appl. No.: 18/089,924

(22) Filed: Dec. 28, 2022

(65) Prior Publication Data

US 2023/0165409 A1  Jun. 1, 2023

Related U.S. Application Data

(63) Continuation-in-part of application No. 17/679,008, filed on Feb. 23, 2022, now Pat. No. 11,547,271.

(60) Provisional application No. 63/155,254, filed on Mar. 1, 2021.

(51) Int. Cl.
*A47J 47/00* (2006.01)

(52) U.S. Cl.
CPC .................................. *A47J 47/005* (2013.01)

(58) Field of Classification Search
None
See application file for complete search history.

(56) References Cited

U.S. PATENT DOCUMENTS

| | | |
|---|---|---|
| 137,996 A | 4/1873 | Barstow |
| 571,349 A | 11/1896 | Farquhar |
| 1,776,961 A | 9/1930 | Vielbig |
| 2,609,024 A | 9/1952 | Russ |
| 3,011,849 A | 12/1961 | Bishop, Jr. |
| 3,460,878 A | 8/1969 | Peterson et al. |
| 3,727,622 A | 4/1973 | Jacobs |
| 3,915,180 A | 10/1975 | Jacobs |
| 4,116,426 A | 9/1978 | Kessler |
| 4,318,537 A | 3/1982 | Dorman et al. |
| 4,592,892 A | 6/1986 | Ueno et al. |
| 5,044,059 A | 9/1991 | De Giulio |
| 5,085,416 A | 2/1992 | Miyake et al. |
| 5,312,178 A | 5/1994 | King |
| 5,915,851 A | 6/1999 | Wattrick et al. |
| 6,063,335 A | 5/2000 | Pirolo et al. |
| 6,453,488 B1 | 9/2002 | Shamroth |
| 6,478,292 B1 | 11/2002 | Sellers |
| 6,666,220 B2 | 12/2003 | Spanyer et al. |
| 6,814,090 B2 | 11/2004 | DeBoer et al. |
| 7,240,380 B2 | 7/2007 | Erickson |
| 7,647,654 B2 | 1/2010 | Shamroth |
| 8,772,744 B1 | 7/2014 | Liu |

(Continued)

OTHER PUBLICATIONS

Maytag Jetclean 24 Inch Convertible/Portable Dishwasher w/ 4 Wash Cycles & Premium Upper Rack: Black, ajmadison.com, https://www.ajmadison.com/cgi-bin/ajmadison/MDC5100AWB.html [Date Accessed: Dec. 8, 2020).

*Primary Examiner* — Rita P Adhlakha

(74) *Attorney, Agent, or Firm* — Bold IP PLLC; Houda El-Jarrah; Randy Fenton

(57) ABSTRACT

A cutting board integrated with an associated washing device is provided. The washing device includes a kitchen appliance such as a dishwasher. The cutting board is configurable with the washing device in a variety of ways. The cutting board is incorporated into the washing device and extendable from the front of the washer for use in preparing food. After use, the board is retracted back into the washer for cleaning.

20 Claims, 3 Drawing Sheets

(56) References Cited

U.S. PATENT DOCUMENTS

| | | |
|---|---|---|
| 8,779,391 B2 | 7/2014 | Flaherty et al. |
| 8,800,984 B2 | 8/2014 | Constantino, Jr. et al. |
| 8,809,806 B1 | 8/2014 | Deese |
| 8,985,567 B2 | 3/2015 | Constantino, Jr. et al. |
| 9,155,427 B1 | 10/2015 | Kumar |
| 9,687,113 B2 | 6/2017 | Torlai et al. |
| 9,839,328 B2 | 12/2017 | Pimentel et al. |
| 10,337,139 B2 | 7/2019 | Desrosiers |
| 2002/0012760 A1 | 1/2002 | Barry et al. |
| 2007/0247043 A1 | 10/2007 | Simmons et al. |

CUTTING BOARD AND WASHER SYSTEM AND METHOD

CROSS-REFERENCE TO RELATED APPLICATIONS

This application is a Continuation in Part application of U.S. patent application Ser. No. 17/679,008, filed Feb. 23, 2022, which claims priority to Provisional Patent Application No. 63/155,254 filed on Mar. 1, 2021, the entire contents of all of which are hereby fully incorporated herein by reference for all purposes.

FIELD OF THE INVENTION

This invention relates to kitchen accessories, including a cutting board and washer assembly.

BACKGROUND

Many living spaces are limited in size, especially in the kitchen area. In such cases, a kitchen may include insufficient countertop space thereby making it difficult to easily prepare food. For example, a kitchen with little countertop space may not enable a person to use a cutting board in tandem with a mixing bowl and a stovetop.

In addition, when a cutting board is used and becomes soiled, using a small sink to clean the cutting board often results in splashing water causing a mess.

Accordingly, there is a need for a cutting board washer system that increases the amount of usable countertop space while providing a mess-free cutting board cleaning procedure.

SUMMARY

According to one aspect, one or more embodiments are provided below for a cutting board assembly including a cutting board including a first cutting surface and a second cutting surface opposite the first cutting surface, a tray configured to support the cutting board, the tray adapted to be slidably coupled to a support structure and adapted to translate from a first tray position to a second tray position with respect to the support structure, and a debris catcher configured with the tray, the debris catcher including a sheet configured to translate from an at least partially spooled configuration when the tray is in the first tray position to an at least partially unspooled configuration when the tray is in the second tray position, the sheet vertically aligned beneath at least a portion of the cutting board when in the at least partially unspooled configuration.

In another embodiment, the cutting board and washer assembly includes a tray slidably coupled to the washer and adapted to releasably secure the cutting board in either the first position or the second position.

In another embodiment, the first tray position places the tray at least partially retracted into the support structure and the second tray position places the tray at least partially extended from the support structure.

In another embodiment, the cutting board assembly incudes recess includes a scraping device positioned to scrape at least a portion of the debris catcher as the sheet translates from the at least partially unspooled configuration to the at least partially spooled configuration.

In another embodiment, the scraping device includes an edge positioned to contact an upper surface of the debris catcher sheet.

In another embodiment, the edge is spring-loaded.

In another embodiment, the tray is configured to releasably secure the cutting board.

In another embodiment, the tray includes a recess configured to hold the cutting board.

In another embodiment, the recess includes a circumferential ledge.

In another embodiment, the recess includes a mesh bottom.

In another embodiment, the recess includes an open bottom.

According to another aspect, one or more embodiments are provided below for a cutting board assembly including a cutting board including a first cutting surface and a second cutting surface opposite the first cutting surface, a tray configured to support the cutting board, the tray adapted to be slidably coupled to a support structure and adapted to translate from a first tray position to a second tray position, and a debris catcher configured with the tray, the debris catcher including a spooled sheet configured to unspool when the tray is placed in the first position and to respool when the tray is placed in the second position.

In another embodiment, the spooled sheet when unspooled is vertically aligned beneath at least a portion of the cutting board.

In another embodiment, the cutting board assembly includes a scraping device positioned to scrape at least a portion of the spooled sheet as the sheet respools upon placement of the tray into the second position.

In another embodiment the scraping device includes an edge positioned to contact an upper surface of the spooled sheet.

In another embodiment, the edge is spring-loaded.

In another embodiment, the tray includes a recess configured to hold the cutting board.

In another embodiment, the recess includes a circumferential ledge.

In another embodiment, the recess includes a mesh bottom or an open bottom.

In another embodiment, the first tray position places the tray at least partially retracted into the support structure and the second tray position places the tray at least partially extended from the support structure.

In another embodiment, the tray is configured to releasably secure the cutting board.

The presently disclosed system and method for evaluating growing media is more fully described in the detailed description below.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification. None of the drawings are to scale unless specifically stated otherwise.

DETAILED DESCRIPTION OF EXEMPLARY EMBODIMENTS

In general, the system and method according to exemplary embodiments hereof includes a cutting board integrated with an associated washing device. In some embodiments, the washing device may include a kitchen appliance such as a dishwasher. The cutting board is configurable with the washing device in a variety of ways. For example, the cutting board may be incorporated into the washing device and extendable from the front of the washer for use in preparing food. After use, the board may be subsequently retractable back into the washer for cleaning.

Figure 1:
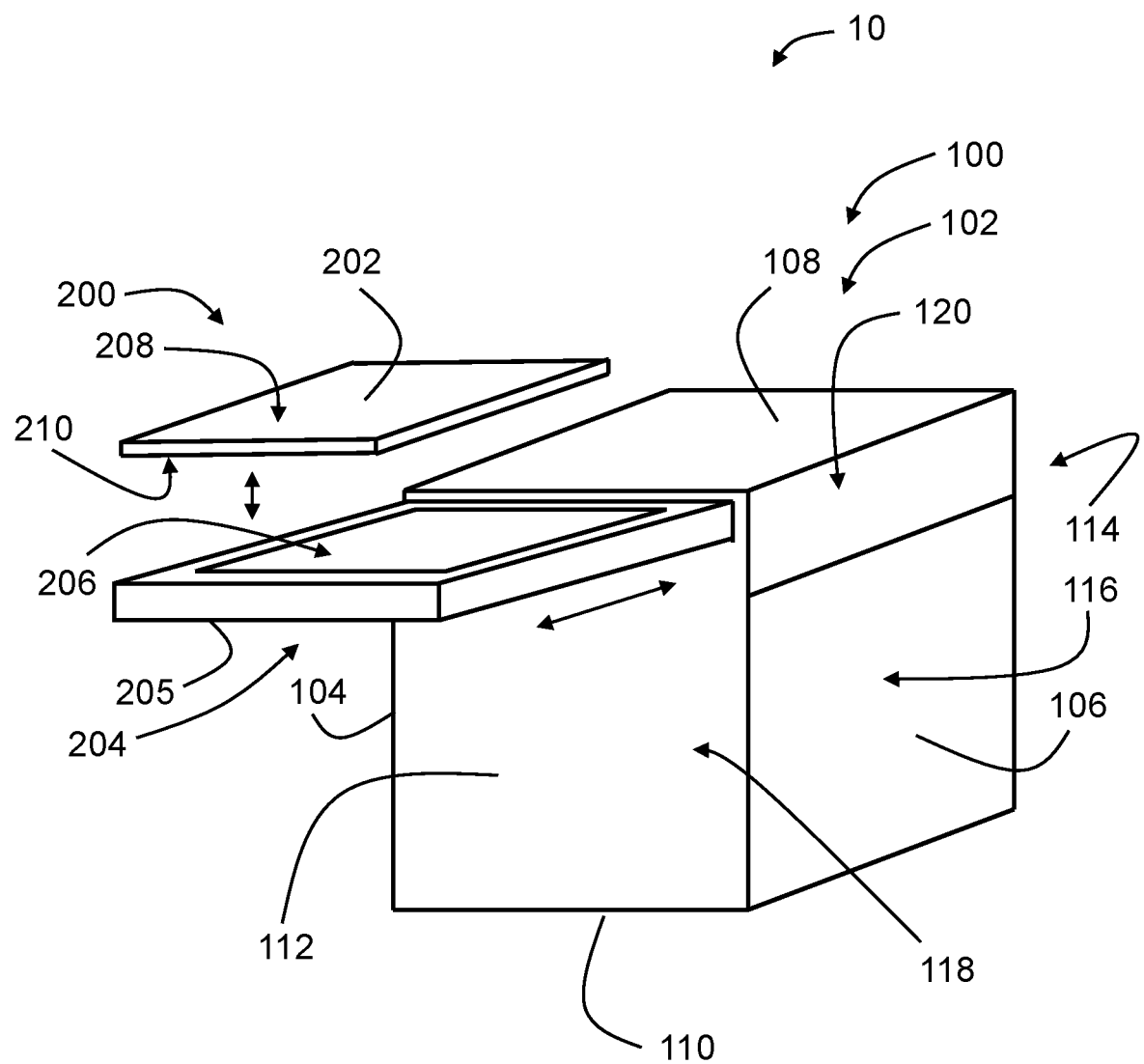
FIG. 1 shows aspects of a cutting board and washer system in accordance with exemplary embodiments hereof.
Figure 2:
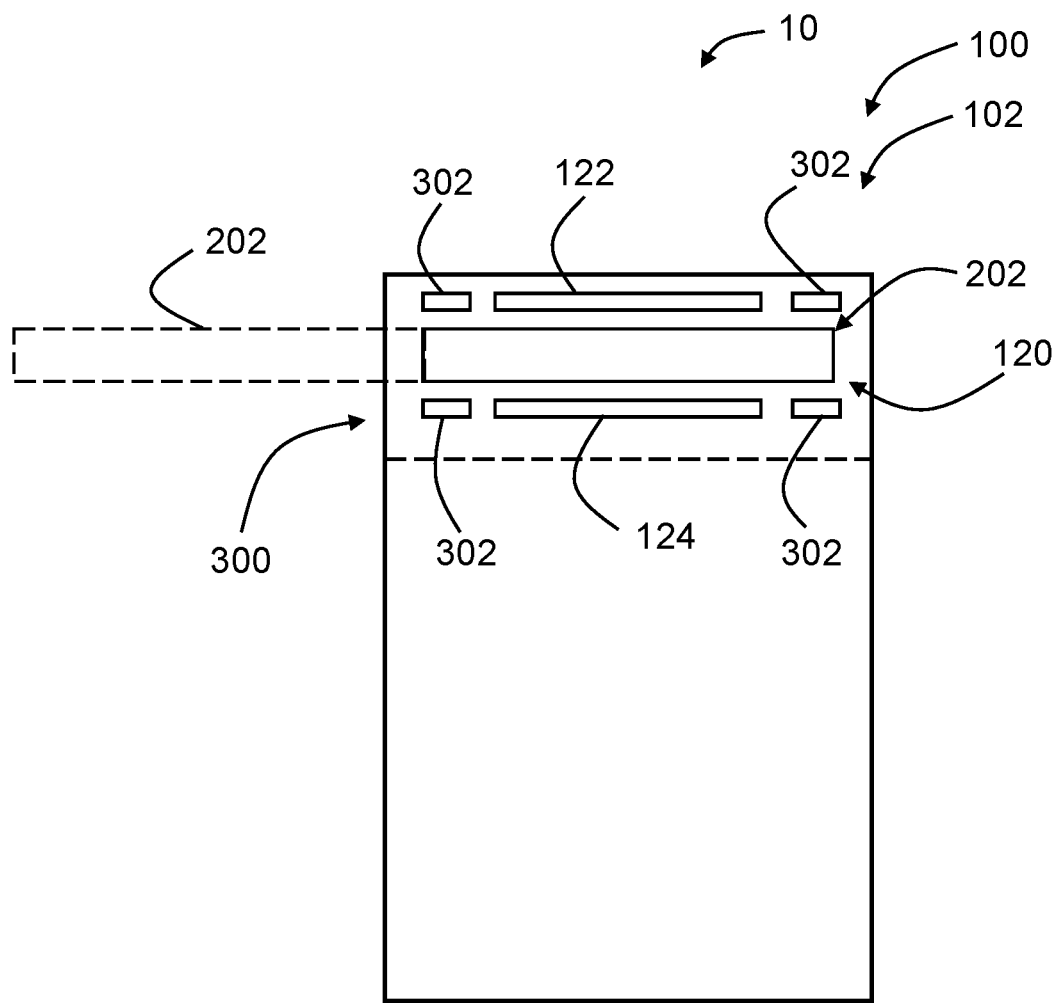
FIG. 2 shows aspects of a cutting board and washer system in accordance with exemplary embodiments hereof.

In one exemplary embodiment hereof as shown in FIG. 1, the cutting board and washing system 10 includes a washer assembly 100 including a washer 102, and a cutting board assembly 200 including a cutting board 202. The system 10 also may include a sterilizer system 300 as shown in FIG. 2 adapted to sterilize the cutting board 202. The system 10 may include other components or elements as necessary for it to fulfill its functionalities as described herein or otherwise.

In some embodiments as shown in FIG. 1, the washer assembly 100 includes a washer 102 (e.g., a dishwasher) or other type of enclosed washing assembly. The washer 102 may generally include a left side 104, a right side 106, a top 108, a bottom 110, a front 112, and a back 114.

For the purposes of this specification, the system 10, and more specifically, the washer 102, will be described primarily as including a dishwasher appliance. However, it is understood that the system 10 may use any type of washer and that the scope of the system 10 is not limited in any way by the type of washer it may utilize.

In some embodiments, the washer 102 includes a primary internal washing chamber 116 for holding and washing items such as dishes, glassware, pans, eating utensils, and other items. The front 112 may include a door 118 that may be opened to provide access to the primary inner chamber 116 so that the items may be inserted into the chamber 116 to be washed, and subsequently removed from the chamber 116 when the washing is completed. In some embodiments, the washer 102 includes a secondary internal washing chamber 120 positioned above (or in any other suitable location with respect to) the primary chamber 116. The secondary chamber 120 may be adapted to receive and clean the cutting board 202 as described in other sections. It will be understood by a person of ordinary skill in the art upon reading this specification that the primary washing chamber 116 may be removed and that the secondary washing chamber 120 may be used without the primary chamber 116 to perform the functionalities required of the system 10. For example, the system 10 may be integrated into a countertop without the need for the primary washing chamber 116.

In some embodiments, the washer 102 includes one or more water jets positioned within the primary and/or secondary washing chambers 116, 120 to provide pressurized water streams adapted to clean items within either chamber 116, 120. This will be described in further detail in other sections.

In some embodiments, the cutting board assembly 200 includes a tray assembly 204 that removably receives and supports the cutting board 202. The tray assembly 204 may be configured with the washer 102, e.g., with the secondary chamber 120, to facilitate (i) the insertion of the cutting board 202 into the washer 102 for cleaning, (ii) the extending of the cutting board 202 out of the washer 102 for use, and (iii) the supporting of the cutting board 202 while in the extended position (for use as a cutting surface). In this way, the cutting board 202 may be drawn out of the chamber 120 and used (at which time the board 202 may become soiled from preparing food items), and subsequently retracted into the chamber 120 for cleaning.

In some embodiments as shown in FIG. 1, the cutting board 202 includes a top cutting surface 208 and a bottom cutting surface 210, both of which may be utilized for cutting items. The cutting board 202 may comprise plastic (such as nylon, polyethylene (PE), high-density polyethylene (HDPE), or other suitable plastics), rubber, wood, marble, metal, other suitable materials, and any combinations thereof. In some embodiments, either surface 208, 210 may be generally smooth, and/or may include grooves or other surface textures or design elements. Because the cutting board 202 may be removable from the tray 205, the board 202 may be positioned within the tray 205 with either side 208, 210 facing upward for use. For example, a first surface 208 may include a roughened texture best suited for cutting bread while a second surface 210 may include channels to guide blood and other juices to a specified location on or off the board 202 best for disposal into the washer 102 (e.g., when cutting raw meat). In other embodiments, the cutting board 202 may include two or more cutting boards 202, each cutting board 202 with surfaces and/or other elements designed for cutting and/or preparing different types of food (e.g., bread, meat, fruits, vegetables, etc.).

In some embodiments, the tray assembly 204 includes a tray 205 including a receiving portion 206 adapted to removably receive and hold the cutting board 202 secure and stable. In some embodiments, the receiving portion 206 includes a recess shaped and dimensioned to receive the cutting board 202 and to hold it firmly flat. Accordingly, the perimeter of the receiving portion 206 may generally match the size and shape of the cutting board 202 when the cutting board 202 is laid flat (either on its top cutting surface 208 or on its bottom cutting surface 210).

The bottom of the receiving portion 206 may be generally open with a circumferential ledge to hold the perimeter edges of the cutting board 202. In other embodiments, the bottom of the receiving portion 206 may include a grid (e.g., a wire grid) so that when the tray 205 is retracted within the washing chamber 120, the tray 205 also may be used to hold cutlery or other items during the cleaning process. In this case, the cutting board 202 may or may not be configured with the receiving portion 206.

In other embodiments, the receiving portion 206 may include side support structures and/or front and/or back support structures (e.g., pegs, ledges, walls, etc.), that may removably hold the cutting board 202 in place. It is understood that the tray 205 may utilize any type(s) of mechanisms to removably receive and hold the cutting board 202 in place as required for the cleaning and/or use of the board 202.

It may be preferable that the cutting board 202 be removable from the receiving portion 206 so that it may be removed and used to deliver prepared food or other items to other areas (e.g., to serve freshly cut fruits or vegetables to the dinner table, to move freshly cut meat to a pan for cooking, etc.). In some embodiments, the receiving portion 206 may include detents, latches, locking pins, or other mechanisms to hold the board 202 in place that may be released to remove the board 202 as required.

In some embodiments, the tray 205 is extendable outward horizontally from the front 112 of the washer 102. It may be preferable that the tray 205 extend outward generally perpendicular to the front 112 of the washer 102, but the tray 205 also may extend outward at other angles. In this way, the tray 205 may generally resemble a drawer in its functionalities.

In some embodiments, the tray assembly 204 includes rails, rollers, or other guide structures (e.g., on the left and right sides) to facilitate the movement of the tray 205 into and out of the washing chamber 120.

In some embodiments, the tray assembly 204 includes gaskets or other types of sealing mechanisms that provide a watertight junction between the tray 205 and the washer 102 when the tray 205 and board 202 are received into the washing chamber 120 for washing. In this way, water may not leak from the washing chamber 120 when the tray 205 is retracted and the board 202 is being cleaned.

As is known in the art, a user of the cutting board 202 may exert downward pressuring to the board 202 while cutting food items on the board's 202's top surface. Accordingly, in some embodiments, the tray assembly 204 is structured to provide a rigid base to the cutting board 202 when the tray 205 in its extended position. In this way, the cutting board 202 may be used proficiently. For example, it is preferable that the tray assembly 204 be designed to bear a predetermined amount of weight sufficient to ensure that the cutting board 202 remain generally level during use. In some embodiments, the tray assembly 204 may be designed to support up to 100-200 lbs. or more.

In some embodiments as shown in FIG. 2, the secondary chamber 120 includes at least one upper water jet 122 and/or at least one lower water jet 124. The upper water jet 122 is configured to clean the cutting board's top surface 208 and the lower water jet 124 is configured to clean the board's bottom surface 210. In some embodiments, the lower water jet 124 also may be configured to clean items in the primary chamber 116 from above. The upper and lower water jets 122, 124 may be used simultaneously, individually, and in any combination. In addition, the washer 102 may be controlled to utilize water jets to wash items in the secondary compartment 120 only, in the primary compartment 116 only, or in both compartments 116, 120 simultaneously. Air jets also may be provided for drying. Note that the upper and lower water jets 122, 124 are represented in FIG. 2 as blocks to indicate that the jets 122, 124 may include any type and/or configuration of one or more cleaning jet(s) as is known in the art.

In some embodiments, the washer 102 may be controlled to use any of the water jets 122, 124 and/or air jets to provide a quick rinse of the cutting board 202 as the board is extended and/or retracted.

In some embodiments as shown in FIG. 2, the secondary chamber 120 may include an ultraviolet germicidal irradiation (UVGI) system 300 configured to sterilize the cutting board 202 prior to, during, or after the cleaning process. The system 300 may include one or more irradiators 302 positioned above, below, to the side(s) and/or in any position to adequately sterilize the cutting board 202 (preferably on both sides 208, 210) when desired.

Figure 3A:
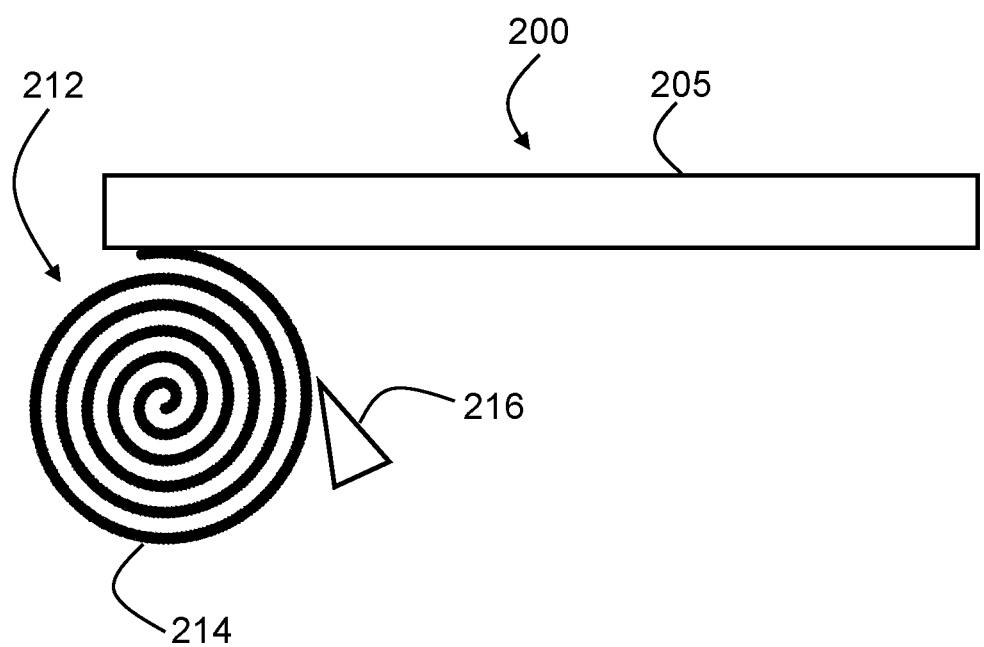
FIGS. 3A-3B show aspects of a crumb catching device in accordance with exemplary embodiments hereof.
Figure 3B:
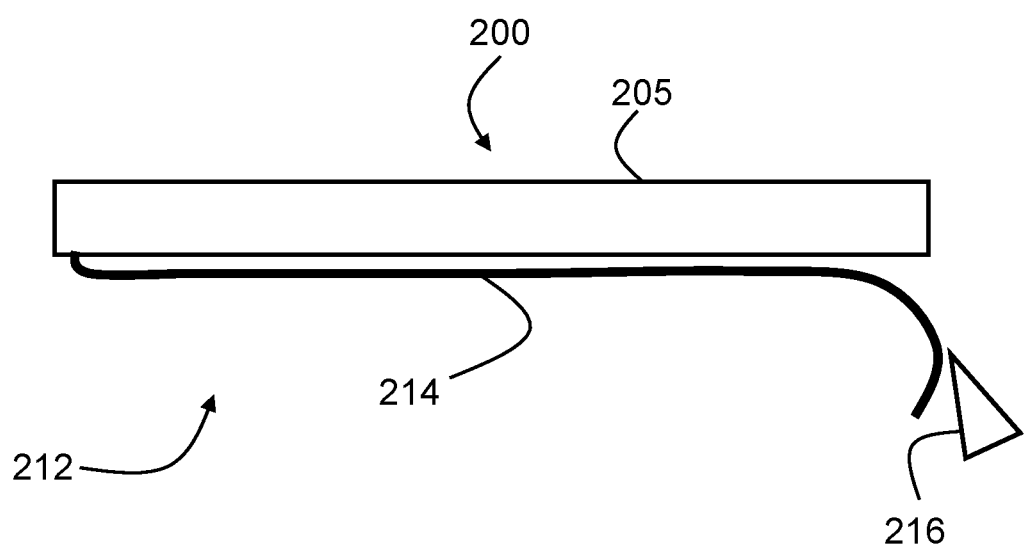

In some embodiments as shown in FIGS. 3A and 3B, the cutting board assembly 200 includes a debris catcher 212 that extends out from the washer 102 in unison with the tray 205 to generally cover the bottom of the tray assembly's 200's receiving portion 206 when in the extended position. In this way, the debris catcher 212 may catch crumbs and other types of debris that may fall from the top surface 208 and/or from the bottom surface 210 of the cutting board 202 when extended and in use.

In some embodiments as shown in FIG. 3A, the debris catcher 212 includes a spring-loaded spooled sheet 214 of silicon, rubber, or other suitable material with the free end of the sheet 214 attached to the cutting board assembly 204 at or near the front of the tray 205 and with the body of the spooled sheet 214 positioned below. In this way, as shown in FIG. 3B, as the tray 205 is extended from the washing chamber 120, the spooled sheet 214 may unspool and generally cover the bottom of the tray assembly's 200's receiving portion 206. Then, when the tray 202 is retracted back into the chamber 120, the spring-loaded sheet 214 may automatically respool for storage. As the sheet 214 is respooled, any debris that it may have collected on the sheet 214 during use of the cutting board 202 may be discarded into the chamber 120 and subsequently removed during the cleaning process.

In some embodiments, the debris catcher 212 includes a scraper 216 configured to scrape debris from the top surface of the sheet 214 as the sheet 214 is respooled and retracted back into the chamber 120. The scraper 216 may include a spring-loaded knife or other type of edge positioned to ride along the upper surface of the sheet 214 as the sheet 214 is respooled. In this way, debris stuck to the sheet 214 may be removed by the scraper 216. The scraped debris may be disposed of as described above.

In some embodiments, the front of the tray assembly 204 may include control elements (e.g., buttons, dials, etc.) that may be used to control the washer 102.

In other embodiments, the top 108 of the washer 102 may include a door or lid that may be opened to provide access to the cutting board assembly 200 within the chamber 120 from above. This embodiment may be preferable when the washer 102 is a stand-alone washer 102 and not positioned below a countertop.

In some embodiments, the cutting board assembly 200, including the cutting board 202 and the tray assembly 204, is configured with structures other than a washer assembly 100. For example, the cutting board assembly 200 may be configured with other types of appliances, countertops, drawers, cabinets, shelves, tables, refrigerators, stand-alone islands, walls, beams, other types of support structures, and any combinations thereof. In these cases, the washer assembly 100 may be omitted and replaced with the alternative support structure. As such, the tray assembly 204 may be designed to retract the tray 205 and cutting board 202 into the support structure for general storage of the cutting board 202 and to subsequently extend the tray 205 and board 202 from the support structure for use. It is understood that the extension of the tray 205 out of and/or the retraction of the tray 205 into the alternative support structure also facilitates the usage of the debris catcher 212 and the scraper 216 as described in other sections. Accordingly, it is understood that all of the details of the cutting board assembly 200 with respect to the washer assembly 100 also may apply to the embodiments regarding the cutting board assembly 200 being configured with an alternative support structure.

It is understood that any aspect or element of any embodiment of the system 10 described herein may be combined with any other aspect or element of any other embodiment of the system 10 to form additional embodiments of the system 10 all of which are within the scope of the system 10.

Where a process is described herein, those of ordinary skill in the art will appreciate that the process may operate without any user intervention. In another embodiment, the process includes some human intervention (e.g., a step is performed by or with the assistance of a human).

As used in this description, the term "portion" means some or all. So, for example, "A portion of X" may include some of "X" or all of "X". In the context of a conversation, the term "portion" means some or all of the conversation.

As used herein, including in the claims, the phrase "at least some" means "one or more," and includes the case of only one. Thus, e.g., the phrase "at least some ABCs" means "one or more ABCs," and includes the case of only one ABC.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only," the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner. A list may include duplicate items. For example, as used herein, the phrase "a list of XYZs" may include one or more "XYZs".

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram, the activities associated with those boxes may be performed in any order, including fully or partially in parallel.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A cutting board assembly comprising:
    a cutting board including a first cutting surface and a second cutting surface opposite the first cutting surface;
    a tray configured to support the cutting board, the tray adapted to be slidably coupled to a support structure and adapted to translate from a first tray position to a second tray position with respect to the support structure; and
    a debris catcher configured with the tray, the debris catcher including a sheet configured to translate from an at least partially spooled configuration when the tray is in the first tray position to an at least partially unspooled configuration when the tray is in the second tray position, the sheet vertically aligned beneath at least a portion of the cutting board when in the at least partially unspooled configuration.

2. The cutting board assembly of claim 1 wherein the first tray position places the tray at least partially retracted into the support structure and the second tray position places the tray at least partially extended from the support structure.

3. The cutting board assembly of claim 1 further comprising:
    a scraping device positioned to scrape at least a portion of the debris catcher as the sheet translates from the at least partially unspooled configuration to the at least partially spooled configuration.

4. The cutting board assembly of claim 3 wherein the scraping device includes an edge positioned to contact an upper surface of the sheet.

5. The cutting board assembly of claim 4 wherein the edge is spring-loaded.

6. The cutting board assembly of claim 1 wherein the tray is configured to releasably secure the cutting board.

7. The cutting board assembly of claim 1 wherein the tray includes a recess configured to hold the cutting board.

8. The cutting board assembly of claim 7 wherein the recess includes a circumferential ledge.

9. The cutting board assembly of claim 7 wherein the recess includes a mesh bottom.

10. The cutting board assembly of claim 7 wherein the recess includes an open bottom.

11. A cutting board assembly comprising:
    a cutting board including a first cutting surface and a second cutting surface opposite the first cutting surface;
    a tray configured to support the cutting board, the tray adapted to be slidably coupled to a support structure and adapted to translate from a first tray position to a second tray position; and
    a debris catcher configured with the tray, the debris catcher including a spooled sheet configured to unspool when the tray is placed in the first position and to respool when the tray is placed in the second position.

12. The cutting board assembly of claim 11 wherein the spooled sheet when unspooled is vertically aligned beneath at least a portion of the cutting board.

13. The cutting board assembly of claim 12 further comprising:
    a scraping device positioned to scrape at least a portion of the spooled sheet as the sheet respools upon placement of the tray into the second position.

14. The cutting board assembly of claim 13 wherein the scraping device includes an edge positioned to contact an upper surface of the spooled sheet.

15. The cutting board assembly of claim 14 wherein the edge is spring-loaded.

16. The cutting board assembly of claim 11 wherein the tray includes a recess configured to hold the cutting board.

17. The cutting board assembly of claim 16 wherein the recess includes a circumferential ledge.

18. The cutting board assembly of claim 16 wherein the recess includes a mesh bottom or an open bottom.

19. The cutting board assembly of claim 11 wherein the first tray position places the tray at least partially retracted into the support structure and the second tray position places the tray at least partially extended from the support structure.

20. The cutting board assembly of claim 11 wherein the tray is configured to releasably secure the cutting board.

* * * * *